US 7,130,295 B2

(12) United States Patent
Kim et al.

(10) Patent No.: US 7,130,295 B2
(45) Date of Patent: Oct. 31, 2006

(54) DATA RETRANSMISSION APPARATUS AND METHOD IN A MOBILE COMMUNICATION SYSTEM

(75) Inventors: Seong-Hun Kim, Seoul (KR); Hyeon-Woo Lee, Suwon-shi (KR); Kook-Heui Lee, Songnam-shi (KR); Sung-Ho Choi, Songnam-shi (KR); Jin-Weon Chang, Yongin-shi (KR)

(73) Assignee: Samsung Electronics Co., Ltd. (KR)

( * ) Notice: Subject to any disclaimer, the term of this patent is extended or adjusted under 35 U.S.C. 154(b) by 1012 days.

(21) Appl. No.: 10/166,867

(22) Filed: Jun. 11, 2002

(65) Prior Publication Data
US 2003/0007480 A1 Jan. 9, 2003

(30) Foreign Application Priority Data
Jun. 11, 2001 (KR) ............... P2001-32603

(51) Int. Cl.
*H04L 12/56* (2006.01)
(52) U.S. Cl. ............ 370/349; 370/394; 370/474
(58) Field of Classification Search ............ 370/335, 370/338, 342, 349, 474, 394
See application file for complete search history.

(56) References Cited

U.S. PATENT DOCUMENTS

2002/0172208 A1* 11/2002 Malkamaki ............ 370/400

OTHER PUBLICATIONS

"Universal Mobile Telecommunications System (UMTS); Radio Interface Protocol Architecture (3G TS 25.301 version 3.3.0 Release 1999)" ETSI TS 125 301 v3.3.0. Jan. 2001. pp. 1-48.*
"3rd Generation Partnership Project; Technical Specification Group Radio Access Network; UTRA High Speed Downlink Packet Access (Release 4)" 3GPP TR 25.950 v4.0.0. Mar. 2001. pp. 1-27.*

* cited by examiner

*Primary Examiner*—Derrick Ferris
(74) *Attorney, Agent, or Firm*—Dilworth & Barrese LLP

(57) ABSTRACT

Disclosed is an apparatus and method for retransmitting data in a mobile communication system. A MAC-h (Medium Access Control-high speed) layer transmits, to an RLC (Radio Link Control) layer, received data and information on whether a retransmission process on errored data is being performed, thereby to prevent the RLC layer from performing duplicated retransmission on the errored data.

15 Claims, 6 Drawing Sheets

DATA RETRANSMISSION APPARATUS AND METHOD IN A MOBILE COMMUNICATION SYSTEM

PRIORITY

This application claims priority to an application entitled "Data Retransmission Apparatus and Method in a Mobile Communication System" filed in the Korean Industrial Property Office on Jun. 11, 2001 and assigned Serial No. 2001-32603, the contents of which are incorporated herein by reference.

BACKGROUND OF THE INVENTION

1. Field of the Invention

The present invention relates generally to a mobile communication system, and in particular, to an apparatus and method for retransmitting packet data in a mobile communication system employing an HSDPA (High Speed Downlink Packet Access) technique.

2. Description of the Related Art

In general, HSDPA refers to a technique for transmitting data including a high-speed downlink shared channel (HS-DSCH)-related control channels in a UMTS (Universal Mobile Telecommunications System) communication system. In order to support the HSDPA, there have been proposed AMC (Adaptive Modulation and Coding) technique, HARQ (Hybrid Automatic Retransmission Request) technique, and FCS (Fast Cell Select) technique. A structure of the UMTS communication system and the AMC, HARQ and FCS techniques will be described in detail herein below with reference to FIG. 1.

FIG. 1 illustrates a structure of a general CDMA communication system. Referring to FIG. 1, a UMTS communication system includes a core network (CN) 100, a plurality of radio network subsystems (RNSs) 110 and 120, and a user equipment (UE) 130. The RNSs 110 and 120 each include a radio network controller (RNC) and a plurality of Node Bs, also known as "cells". For example, as illustrated in FIG. 1, the RNS 110 is comprised of an RNC 111 and Node Bs 113 and 115. Further, the RNC is classified into a serving RNC (SRNC), a drift RNC (DRNC) and a controlling RNC (CRNC) according to its role. An RNC managing information on a UE and managing data communication with the core network is called an SRNC of the UE, and when data targeting the UE is transmitted to and received from an SRNC through another RNC, this RNC is called a DRNC of the UE. Further, an RNC controlling operation of Node Bs is called a CRNC of the Node Bs. In FIG. 1, if information on the UE 130 is managed by the RNC 111, the RNC 111 becomes an SRNC of the UE 130, and in this condition, if data targeting the UE 130 is transmitted and received through an RNC 121, the RNC 121 becomes a DRNC of the UE 130. Further, the RNC 111 controlling the Node B 113 becomes a CRNC of the Node B 113.

Now, a description of the AMC, HARQ, and FCS techniques will be made with reference to FIG. 1.

First, the AMC is a data transmission technique for adaptively determining a modulation mode and a coding mode of different data channels according to a channel condition between a specific Node B, e.g., Node B 123, and the UE 130, thereby to increase the overall utilization efficiency of a cell. Therefore, the AMC have a plurality of modulation modes and a plurality of coding modes, and modulates and codes data channels by combining the modulation modes and the coding modes. Generally, each of combinations of the modulation modes and the coding modes are called "MCS (Modulation and Coding Scheme)", and there are a plurality of MCSs with level #1 to level #n according to the number of combinations of the modulation modes and the coding modes. In other words, the AMC technique adaptively determines a level of the MCS according to a channel condition between the Node B 123 and the UE 130 currently wirelessly connected to the Node B 123, thereby increasing the overall utilization efficiency.

Second, the FCS technique rapidly selects a cell having a good channel condition among a plurality of cells, when a UE receiving an HSDPA service enters a cell-overlapped region. To be specific, if the UE 130 receiving the HSDPA service enters a cell-overlapped region, or a soft handover region, between the Node B 123 and the Node B 125, then the UE 130 establishes radio links to the cells in the soft handover region. Here, a set of the cells, to which the radio links are established by the UE 130, is called an "active set". The FCS technique receives HSDPA packets from only the cell maintaining the best channel condition with the UE 130 among the cells included in the active set, thereby to reduce the overall interference. Generally, a cell transmitting the HSDPA packets for its best channel condition with the UE 130 among the cells in the active set is called a "best cell". The UE 130 periodically checks the channel conditions with the cells belonging to the active set. Upon detecting a cell having a channel condition better than that of the current best cell, the UE 130 transmits a best cell indicator to the cells in the active set in order to replace the current best cell with a new best cell. The best cell indicator includes an identifier indicating a cell that is selected as the new best cell. Upon receiving the best cell indicator, the cells belonging to the active set analyze the cell identifier included in the received best cell indicator to determine whether the received best cell indicator is destined for them. The selected best cell transmits HSDPA packets to the UE 130 using a high-speed downlink shared channel (HS-DSCH).

Third, the HARQ, or n-channel SAW HARQ (n-channel Stop And Wait Hybrid Automatic Retransmission Request) technique, will be described. For the HARQ, there have been proposed the following two plans to increase efficiency of the ARQ (Automatic Retransmission Request) technique. First, the HARQ performs data retransmission request and response between the UE and the Node B. Second, the HARQ temporarily stores errored data and then combines it with a retransmission portion of the corresponding data before transmission.

Next, an RLC (Radio Link Control) ARQ technique and the HARQ technique will be described with reference to FIG. 2.

FIG. 2 schematically illustrates a protocol stack of a mobile communication system using an HSDPA technique. Referring to FIG. 2, the UE 130 and the Node B 123 each have a new layer, called a MAC-h (Medium Access Control-high speed) layer 201 and 205, in order to support the AMC, HARQ and FCS. That is, the MAC-h 205 of the Node B 123 performs UE scheduling, MCS allocation, and HARQ processing. As illustrated in FIG. 2, there exists an RLC ARQ function between RLC 203 of the UE 130 and RLC 207 of the SRNC 121, and there exists an HARQ function between the MAC-h 205 of the Node B 123 and MAC-h 201 of the UE 130.

Specifically, since the RLC ARQ performed between the RLC 203 of the UE 130 and the RLC 207 of the SRNC 121 occurs between the SRNC 121 and the UE 130, it takes a long time to make a retransmission request and respond to the retransmission request. However, in the HARQ, retransmission request and response is directly performed between the UE 130 and the Node B 123, so it takes a short time to make a retransmission request and respond to the retransmission request. In addition, the RLC ARQ immediately discards the errored data, whereas the HARQ temporarily stores the errored data and then combines it with a retransmission portion of the corresponding data before decoding, thereby to reduce error occurrence possibility. Here, the combining technique includes a chase combining (CC) technique and an incremental redundancy (IR) technique.

The CC technique transmits the same data at both initial transmission and retransmission, whereas the IR technique transmits different data at initial transmission and retransmission. The CC and IR techniques will be described with reference to a case where an R=1/6 turbo code is used as a mother code and a coding rate is 3/4. First, in the CC technique, if the mother code has generated N bits, a transmission side transmits $N*(1/6)*(4/3)$ bits at initial transmission by puncturing some of the N bits, and upon receipt of NACK in response to the initial transmission, retransmits the $N*(1/6)*(4/3)$ bits that were transmitted at the initial transmission. A reception side then stores the data received at the initial transmission, receives again the same data at the retransmission, and symbol-combines the stored data with the received data before decoding. Second, in the IR technique, the transmission side transmits $N*(1/6)*(4/3)$ bits at initial transmission by puncturing some of the N bits generated by the mother code. The reception side receives the bits transmitted at the initial transmission, decodes the received bits, and performs CRC (Cyclic Redundancy Check) checking on the decoded bits, and upon detecting a CRC error, transmits a NACK signal to the transmission side. Upon receiving the NACK signal, the transmission side retransmits to the reception side $N*(1/6)*(4/3)$ bits excepting the $N*(1/6)*(4/3)$ bits transmitted at the initial transmission among the N bits, or $N*(1/6)*(4/3)$ bits including only some of the $N*(1/6)*(4/3)$ bits transmitted at the initial transmission. The reception side then decodes the $N*(1/6)*(4/3)$ bits received at the initial transmission and the $N*(1/6)*(4/3)$ bits received at the retransmission, performs CRC checking on the decoded bits, and upon detecting a CRC error, transmits again a NACK signal to the transmission side. Upon receipt of the NACK signal, the transmission side repeats transmitting new $N*(1/6)*(4/3)$ bits to the reception side so that the reception side may receive N bits. Therefore, the reception side can receive as many bits as a coding rate of the mother code and decode the received bits, thus making it possible to obtain an overall coding gain. In this way, the IR uses different bit streams at the initial transmission and the retransmission, and this is called "version". That is, initial transmission is called "version 0", first retransmission "version 1", and second retransmission "version 2".

In the HSDPA, the HARQ function is added to the MAC-h, so that the RLC and the MAC-h can independently perform an error control function. The RLC performs error control on the assumption that a post-RLC stage sequentially transmits RLC PDUs (Protocol Data Unit).

However, if the MAC-h performs the HARQ, the RLC PDUs may not be sequentially transmitted from the MAC to the RLC. In this case, the retransmission is performed inefficiently. For example, it will be assumed that during transmission of PDUs with RLC sequence numbers of 1, 2, 3, 4, 5, 6 and 7 from the Node B to the UE, data errors have occurred in the PDUs with sequence numbers of 3 and 4 on the radio link. Since the PDUs with sequence numbers of 1, 2, 5, 6 and 7 are received without errors, the MAC of the UE, a reception side, transmits the received error-free PDUs with sequence numbers of 1, 2, 5, 6 and 7 to the RLC. However, the PDUs with sequence numbers of 3 and 4, i.e., the errored PDUs, undergo an HARQ process in the MAC-h 201 of the UE and the MAC-h 205 of the Node B, and if no error is detected in the HARQ process, they are transmitted to the RLC of the UE. Here, a detailed operation of the RLC ARQ will be made. The RLC has a transparent mode (TM), an acknowledged mode (AM) and an unacknowledged mode (UM) as its operation mode. However, the HS-DSCH operates only in the AM and the UM, so the description will be restricted herein to the AM and the UM. When the RLC operates in the UM, the RLC segments a service data unit (SDU) provided from an upper layer in a proper size, or assembles the PDUs received from a lower layer into an SDU. Further, the RLC enciphers the SDU provided from the upper layer, or deciphers the PDUs provided from the lower layer. If the RLC operation mode is UM, a header of the RLC PDU includes a sequence number (SN), a length indicator (LI) and an extension bit (E). The SN indicates sequence numbers sequentially assigned to the RLC PDUs generated by segmenting the SDU provided form the upper layer in a predetermined size. The SN is used when generating SDU by reassembling the RLC PDUs having the SNs. Of course, if the size of the SDU is smaller than the predetermined size, i.e., the size of the RLC PDU, then several SDUs are concatenated to generate one RLC PDU. The LI serves as a pointer pointing a position of the SDU in the RLC PDU. If the size of the SDU is larger than the predetermined size, several RLC PDUs are concatenated to generate one SDU. Here, the LI may exist in first and last RLC PDUs. The LI existing in the first RLC PDU indicates a start position of the SDU, and the LI existing in the last RLC PDU indicates a last position of the SDU. The E indicates whether the next value is a header or data. In general, if the RLC operates in the UM, a transmission operation is performed as follows.

The transmission operation for the RLC operating in the UM is divided into a case where the SDU is provided form the upper layer and another case where the RLC PDUs are provided from the lower layer. First, reference will be made to the case where the SDU is provided from the upper layer. Upon receiving SDU from the upper layer, the RLC segments or concatenates the received SDU into PDUs with a predetermined size in an initial call setup process. The RLC inserts headers including the SNs into the segmented or concatenated PDUs, and the data generated in this manner is RLC PDU.

Next, the RLC, to which the RLC PDUs are provided from the lower layer, reassembles the provided RLC PDUs into SDUs using information included in the headers of the RLC PDUs. For example, if 10 RLC PDUs with SN=1 to SN=10 are transmitted, LI of the RLC PDU with SN=1 indicates that a payload of the corresponding RLC PDU is a start point of a new SDU, and if the last bit of the payload of the RLC DU with SN=10 indicates the last bit of the SDU, the 10 RLC PDUs are concatenated into one SDU. In the prior art, if the SNs of the received RLC PDUs are not sequential, i.e., if there are errored RLC PDUs, all of the RLC PDUs belonging to the SDUs related to the errored RLC PDUs are discarded. For example, if an error has occurred in the RLC PDU with SU=7, all of the remaining RLC PDUs with SN=1 to SN=10 that were normally received are discarded. Therefore, when the MAC-h performs the HARQ process, the RLC PDUs may not sequentially arrive at the RLC, so that the RLC reception operation causes unnecessary discarding operation, leading to a reduction in communication efficiency.

Next, a description will be made of another case where the RLC operation mode is AM. When the RLC operates in the AM, the RLC PDU structure is comprised of DIC (Data or Control), SN, LI, P (Polling), HE (Header Extension), E (Extension), DATA, and STATUS PDU. Here, D/C, comprised of one bit, indicates whether the corresponding RLC PDU is a control RLC PDU or a data RLC PDU. SN indicates sequence numbers of the RLC PDUs as in the case where the RLC operates in the UM. LI serves as a pointer for start points of the SDUs when several SDUs exist in the corresponding RLC PDU, as in the case where the RLC operates in the UM. P, comprised of one bit, indicates whether or not a reception side of the corresponding RLC PDU should report its RLC state. HE indicates whether the next bits are data, or LI and E. E indicates whether the next bits are data bits or LI and E bits. DATA represents RLC PDU data obtained by segmenting or concatenating SDUs. STATUS PDU is control information to be notified to the reception side by the transmission side. Typically, the control information is retransmission information or information on the data to be possibly transmitted later. The operation for the case where the RLC operates in the AM is more complex than the operation for the case where the RLC operates in the UM, so the description will be made with reference to FIG. 4.

FIG. 4 schematically illustrates an RLC structure for the case where the RLC operates in the AM in a general CDMA communication system. Referring to FIG. 4, a segmentation/concatenation part 401 segments or concatenates SDUs provided from the upper layer in a predetermined PDU size. A ciphering part 402 enciphers the PDUs, and an RLC header adder 403 adds the header information D/C, SN, LI and HE to the output of the ciphering part 402. Here, when the RLC operates in the UM, SN has 7 bits. However, when the RLC operates in the AM, the SN has 12 bits. A retransmission buffer & manager 404 stores RLC PDUs, ACK (acknowledgement) signals for which have not yet received, in its retransmission buffer, and retransmits or discards the corresponding RLC PDUs according to a retransmission request for the STATUS PDU added to the received RLC PDU or the contents of the received STATUS PDU. A multiplexer (MUX) 405 multiplexes the outputs of the RLC header adder 403 and the retransmission buffer & manager 404 into one stream, and provides its output to a transmission buffer 406. An RLC header setting part 407 inserts STATUS PDU to be transmitted to the reception side or sets the P bit before transmission, under the control of an RLC controller 413.

In addition, a demultiplexing/routing part 408 determines whether RLC PDU received from the lower layer is STATUS PDU or data PDU. If the received RLC PDU is STATUS PDU, the demultiplexing/routing part 408 provides the received RLC PDU to the RLC controller 413. However, if the received RLC PDU is data PDU, the demultiplexing/routing part 408 provides the received RLC PDU to a reception buffer & retransmission manager 409. The reception buffer & retransmission manager 409 stores the received RLC PDUs until one SDU is assembled in its reception buffer. The reception buffer & retransmission manager 409 manages the retransmission buffer of the retransmission buffer & manager 404 using information on the STATUS PDU. That is, the reception buffer & retransmission manager 409 transmits information on the PDUs to be retransmitted and the PDUs to be discarded to the retransmission buffer & manager 404, the information being represented by SN in the STATUS PDU, thereby controlling retransmission and discard of the corresponding PDUs. An RLC header extractor 410 removes headers of the received RLC PDUs and transmits header information to the retransmission buffer of the retransmission buffer & manager 404. A deciphering part 411 deciphers PDUs received for the RLC header extractor 410. A reassembler 412 reassembles the deciphered PDUs received from the deciphering part 411 into one SDU, and transmits the reassembled SDU to the upper layer. The ARQ of the RLC operating in the AM will be described herein below in more detail.

It is assumed herein that an SDU is transmitted from the upper layer to an RNC A at time t0. The SDU is applied to the segmentation/concatenation part 401, and the segmentation/concatenation part 401 segments the received SDU into 20 PDUs, and provides the 20 segmented PDUs to the ciphering part 402. The ciphering part 402 enciphers the 20 segmented PDUs provided from the segmentation/concatenation part 401, and provides the 20 enciphered PDUs to the RLC header adder 403. The RLC header adder 403 assigns SNs of integers n to n+19 to the 20 enciphered PDUs output from the ciphering part 402, and provides its outputs to the multiplexer 405. At this point, if it is assumed that there is no input from the retransmission buffer & manager 404, the multiplexer 405 sequentially outputs the 20 PDUs provided from the RLC header adder 403 to the RLC header setting part 407 through the transmission buffer 406. The RLC header setting part 407 sets the P bit. That is, it is assumed that the PDUs are transmitted to the MAC layer after sending a STATUS PDU transmission request to a UE B, an arbitrary transmission side.

Meanwhile, if the RLC PDUs are transmitted to the UE B at time t1, the demultiplexing/routing part 408 demultiplexes the received RLC PDUs and provides its outputs to the reception buffer & retransmission manager 409. The reception buffer & retransmission manager 409 analyzes the SNs of the RLC PDUs provided from the demultiplexing/routing part 408, to determine whether an error has occurred in a specific RLC PDU. As a result of the analysis, if the SNs are not sequential, the reception buffer & retransmission manager 409 notifies an SN of a non-received RLC PDU to the RLC header setting part 407, and inserts this information into STATUS PDU of the RLC PDU to be transmitted. Upon receiving the STATUS PDU-inserted RLC PDU, the RNC A outputs the STATUS PDU-inserted RLC PDU to the RLC header extractor 410 through the demultiplexing/routing part 408 and the reception buffer & retransmission manager 409. Upon receiving the STATUS PDU-inserted RLC PDU, the RLC header extractor 410 transmits this information to the retransmission buffer 404 to perform retransmission. If the UE B successfully receives the retransmitted RLC PDUs, all of the RLC PDUs for constituting one SDU are stored in the reception buffer of the reception buffer & retransmission manager 409, and the stored RLC PDUs are output to the RLC header extractor 410. Here, since it is assumed that STATUS PDU is not added to the RLC PDU during transmission, the RLC header extractor 410 performs only an operation of removing the headers from the RLC PDUs, and the reassembled data is transmitted to the upper layer through the deciphering part 411 and the reassembler 412.

As described above, when the RLC operates in the AM, retransmission management of the transmission side is performed based on the retransmission information included in the STATUS PDU transmitted by the transmission side. STATUS PDU transmission of the reception side may be performed either periodically or when a specific condition is satisfied. Here, the "specific condition" refers to a case where the P bit of the received RLC PDU has 1 bit, or a case where SNs of the received RLC PDUs are not sequential. As stated before, the reception side temporarily stores the received RLC PDUs in its reception buffer, and then transmits the stored RLC PDUs to the upper layer if it can reassemble them into one SDU. If there is a non-received RLC PDU, the reception side stores the received RLC PDUs in its reception buffer, and waits until the non-received RLC PDU arrives.

To sum up, not only the communication system using the HSDPA technique performs retransmission on the retransmission information included in the STATUS PDU transmitted by the reception side, but also the MAC-h performs retransmission through a Uu interface (an interface between the UE and Node B), so there is possibility that the retransmission process will be duplicated (or overlapped). That is, if the RLC does not recognize the data currently undergoing the retransmission process in the MAC-h as a non-received RLC PDU, then unnecessary STATUS PDU is transmitted.

As described above, when the RLC operates in the AM, the RLC presumes that the lower layer sequentially transmits RLC PDUs. Therefore, upon receiving RLC PDUs with SN=1, 2, 5, 6 and 7 from the MAC, the RLC recognizes that the RLC PDUs with SN=3 and 4 are not received yet. In this case, the RLC sends a retransmission request to the RLC of the transmission side though the MAC-h performs retransmission. As a result, the RLC PDUs with SN=3 and 4 are subject to duplicated retransmission: one retransmission through the RLC ARQ and another retransmission through the HARQ.

SUMMARY OF THE INVENTION

It is, therefore, an object of the present invention to provide a data retransmission apparatus and method for preventing duplicated retransmission on errored data in a mobile communication system.

It is anther object of the present invention to provide an apparatus and method for awaiting or performing data retransmission according to retransmission on data errored in a MAC-h layer by an RLC layer operating in an acknowledged mode (AM).

It is further another object of the present invention to provide an apparatus and method for determining whether to discard received data according to retransmission on data errored in a MAC-h layer by an RLC layer operating in an unacknowledged mode (UM).

According to a first aspect of the present invention, there is provided a method for retransmitting data in a mobile communication system including a MAC-h layer for performing data retransmission between a UE and a Node B, and an RLC layer for performing data retransmission between the UE and an RNC. The method comprises transmitting, from the MAC-h layer to the RLC layer, received RLC PDUs and a parameter indicating whether a retransmission process on at least one non-received RLC PDU is being performed; and receiving by the RLC layer the RLC PDUs and the parameter, and awaiting or performing retransmission on the non-received RLC PDU according to whether the parameter indicates that the retransmission process is being performed, if there is at least one non-received RLC PDU associated with the received RLC PDUs.

According to a second aspect of the present invention, there is provided a method for retransmitting data in a mobile communication system including a MAC-h layer for performing data retransmission between a UE and a Node B, and an RLC layer for performing data retransmission between the UE and an RNC. The method comprises transmitting received RLC PDUs and a parameter indicating whether a retransmission process on at least one non-received RLC PDU is being performed, from the MAC-h layer to the RLC layer; and receiving by the RLC layer the RLC PDUs and the parameter, and determining whether to perform retransmission on the non-received RLC PDU according to whether the parameter indicates that the retransmission process is being performed, if there is at least one non-received RLC PDU associated with the received RLC PDUs.

According to a third aspect of the present invention, there is provided an apparatus for retransmitting data in a mobile communication system. The apparatus comprises a MAC-h layer for transmitting to an RLC layer received RLC PDUs and a parameter indicating whether a retransmission process on at least one non-received RLC PDU is being performed; and an RLC controller for receiving the RLC PDUs and the parameter, analyzing the parameter to determine if there is at least one non-received RLC PDU associated with the received RLC PDUs, and determining whether to perform retransmission on the non-received RLC PDU according to whether the retransmission process is being performed.

According to a fourth aspect of the present invention, there is provided an apparatus for retransmitting data in a mobile communication system. The apparatus comprises a MAC-h layer for transmitting to an RLC layer received RLC PDUs and a parameter indicating whether a retransmission process on at least one non-received RLC PDU is being performed; and an RLC controller for receiving the RLC PDUs and the parameter, analyzing the parameter to determine if there is at least one non-received RLC PDU associated with the received RLC PDUs, and determining whether to await or perform retransmission on the non-received RLC PDU according to whether the retransmission process is being performed.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention prevents duplicated retransmission of RLC (Radio Link Control) PDU (Protocol Data Unit) by modifying an operation of an RLC layer while a MAC-h (Medium Access Control-high speed) layer is performing an HARQ (Hybrid Automatic Retransmission Request) function. In order to prevent the duplicated retransmission of the RLC PDU, the RLC layer should modify an operating process of general RLC ARQ (Automatic Retransmission Request), and the MAC-h layer should also modify an operating process of general HARQ in such a manner that HARQ processing is notified to the RLC layer. The present invention provides a method of modifying such operations. Herein, the RLC layer and the MAC-h layer will be called as "RLC" and "MACh" for short.

First, the MAC-h performing HARQ notifies to the MAC-h that the MAC-h is performing HARQ. To this end, parameters HARQ_PROCESSING and HARQ_CLEAR are newly defined in a primitive MAC-DATA-IND between the MAC and the RLC. Upon receiving data provided from a physical layer, the MAC-h assembles the received data into MAC-DATA-IND and transmits it to the RLC. If the MAC-h is performing the HARQ, the MAC-h transmits the MAC-DATA-IND with the parameter HARQ_PROCESSING. However, if the MAC-h is not performing the HARQ, the MAC-h transmits the MAC-DATA-IND with the parameter HARQ_CLEAR. Such processes will be described with reference to FIG. 3.

Figure 1:
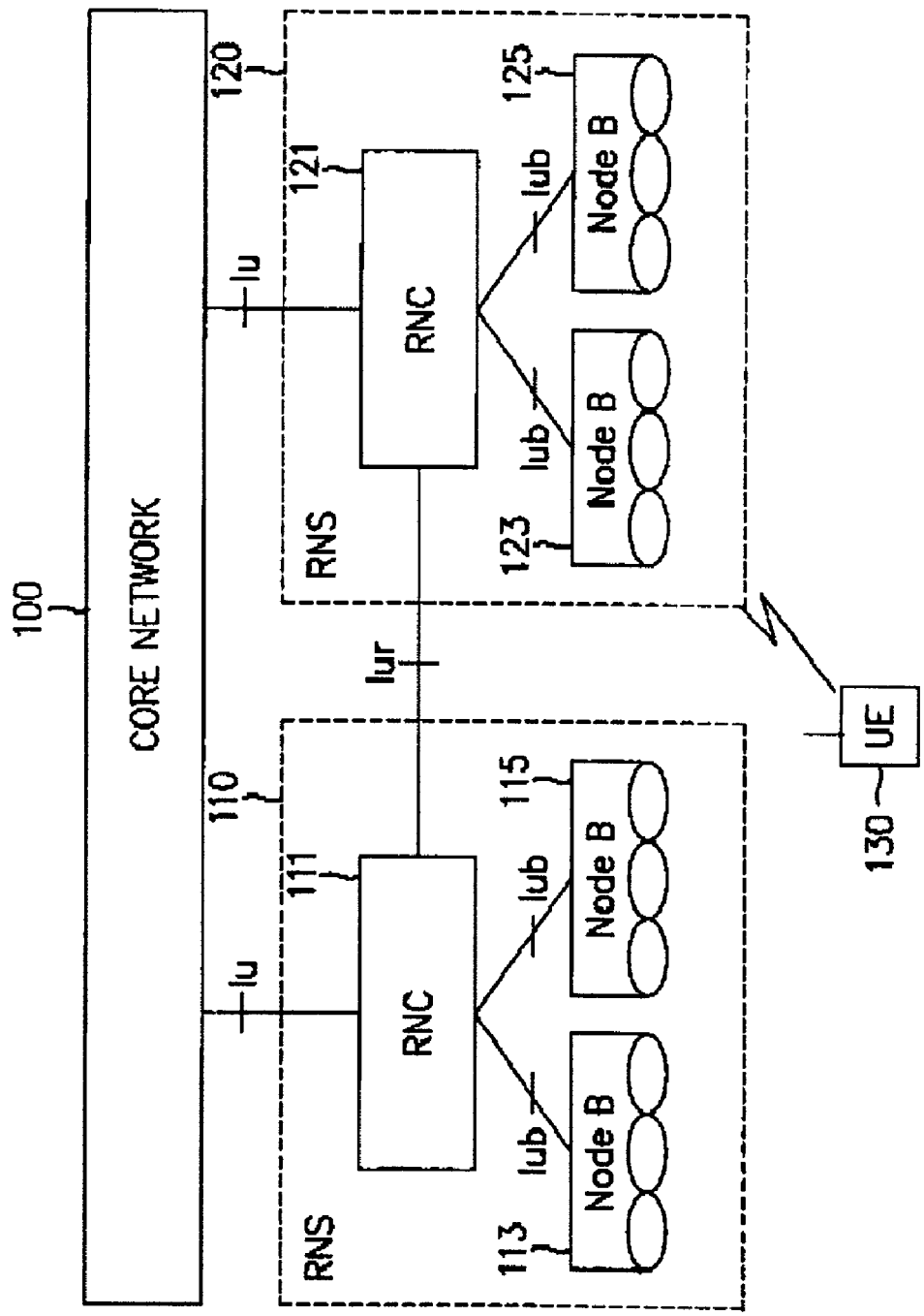
FIG. 1 illustrates a structure of a general CDMA communication system.
Figure 2:
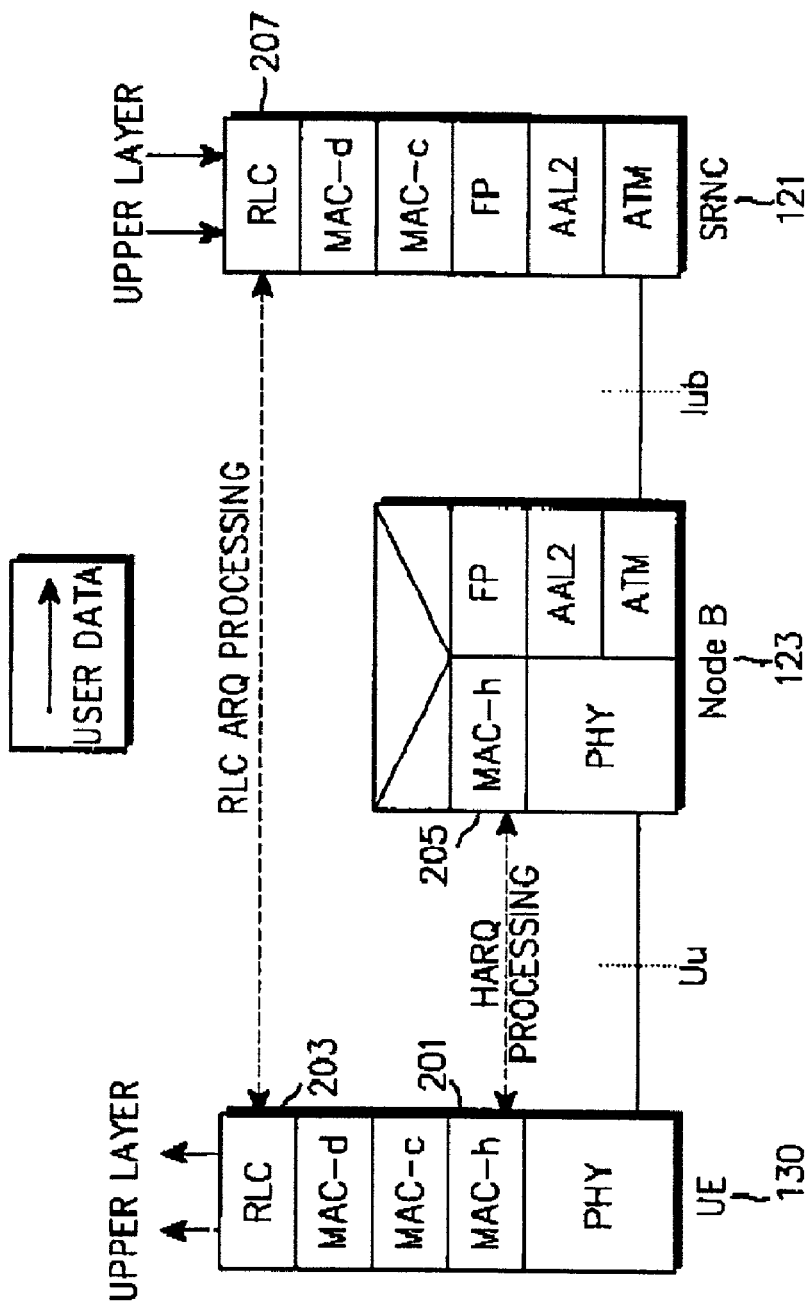
FIG. 2 schematically illustrates a protocol stack of a mobile communication system using an HSDPA technique.
Figure 3:
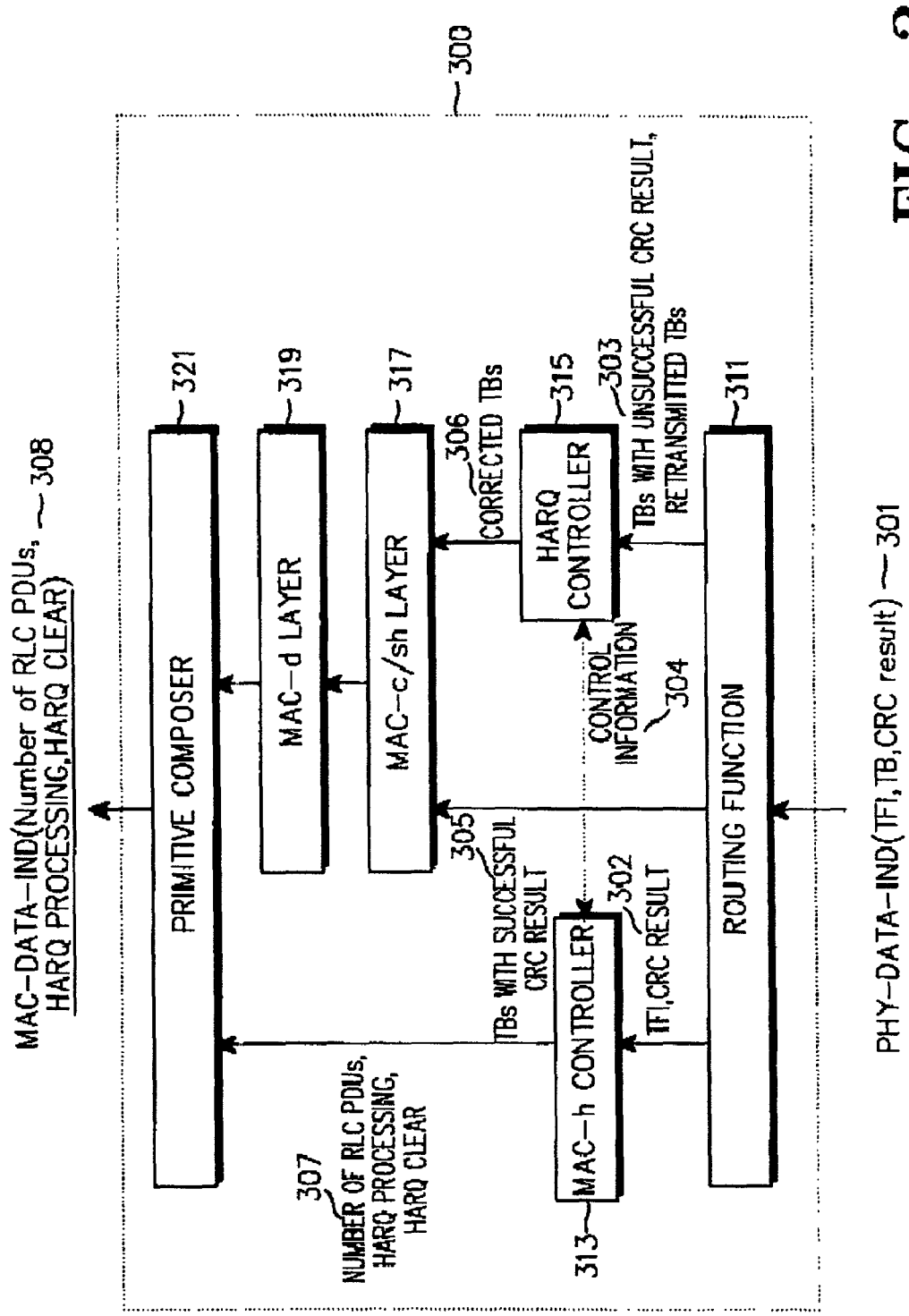
FIG. 3 schematically illustrates a MAC-h structure notifying the RLC whether HARQ processing is being performed according to an embodiment of the present invention.
Figure 4:
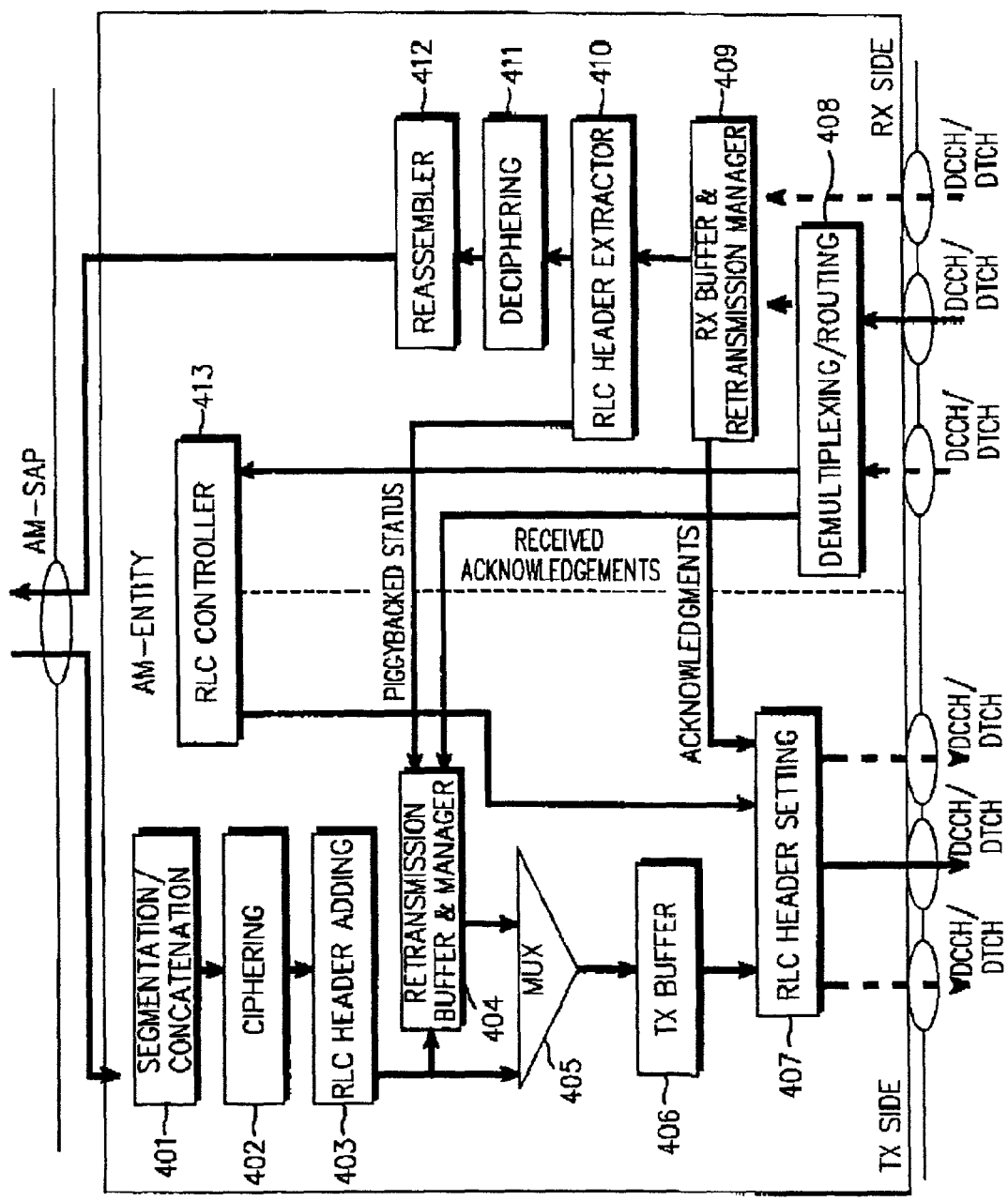
FIG. 4 schematically illustrates an RLC structure for the case where the RLC operates in the AM in a general CDMA communication system.

FIG. 3 schematically illustrates a MAC-h structure notifying the RLC whether HARQ processing is being performed according to an embodiment of the present invention. Referring to FIG. 3, upon receiving data through a Uu interface, a physical layer performs a CRC (Cyclic Redundancy Check) operation on the received data, and then transmits a parameter PHY_DATA_IND including CRC result, TBS (Transport Block Set) and TFI (Transport Format Indicator) to the MAC (Ref. No. 301). Here, the TBS represents a set of user data blocks or transport blocks (TBs) received at a corresponding time. The TFI represents is a logical indicator for information required for processing the data received from the physical layer, and includes such physical layer-related information as error protection type, coding rate and puncturing limit, and such information as TB and TBS sizes. A routing function part 311 provides TFI and CRC result included in the PHY-DATA-IND received from the physical layer to a MAC-h controller 313 (Ref. No. 302). Further, the routing function part 311 provides error-free TBs or the TBs retransmitted through HARQ to an HARQ controller 315 (Ref. No. 303). The HARQ controller 315 stores errored TBs in an HARQ buffer included therein, and upon receiving a retransmission portion of the TBs from the routing function part 311, combines the errored TBs with the retransmission portion of the TBs using a predetermined combing technique, e.g., IR (Incremental Redundancy) technique or CC (Chase Combining) technique. A MAC-c/sh layer 317 and a MAC-d layer 319 generates RLC PDUs by processing MAC headers of the TBs transmitted from the routing function part 311 and the HARQ controller 315, and provides the generated RLC PDUs to a primitive composer 321. Operations of the MAC-c/sh layer 317 and the MAC-d layer 319 have no direct connection with the present invention, so a detailed description of them will not be provided. The primitive composer 321 assembles MAC-DATA-IND using the RLC PDUs transmitted from the MAC-d layer 319 or the MAC-c/sh layer 317 and the parameters transmitted from the MAC-h controller 313, and then transmits the assembled MAC-DATA-IND to the RLC (Ref. No. 308). Here, the parameters transmitted by the MAC-h controller 313 include a "Number of RLC PDUs" parameter indicating the number of RLC PDUs to be transmitted, and an HARQ PROCESSING parameter indicating that the MAC-h is currently performing HARQ or HARQ CLEAR parameter indicating that the MAC-h is not currently performing HARQ. The HARQ PROCESSING parameter and the HARQ CLEAR parameter are newly added in the present invention to inform the RLC of the current HARQ-related state in the MAC-h. In addition, the MAC-DATA-IND transmitted from the primitive composer 321 to the RLC is comprised of the "Number of RLC PDUs" parameter, either the HARQ PROCESSING parameter or the HARQ CLEAR parameter, and RLC PDUs that are actually transmitted. Here, the "Number of RLC PDUs" parameter indicates the number of RLC PDUs transmitted through the MAC-DATA-IND, and the number of the RLC PDUs is calculated through the TFI. In addition, the MAC-h controller 313 examines the HARQ controller 315, thereby to determine the HARQ processing state, i.e., whether or not the MAC-h is currently performing the HARQ. That is, if there is data stored in the HARQ buffer of the HARQ controller 315 to be combined with the retransmission portion at a time when the MAC-DATA-IND is transmitted to the RLC, the MAC-h controller 313 generates the HARQ_PROCESSING parameter and provides it to the primitive composer 321. However, if there is no data stored in the HARQ buffer to be combined with the retransmission portion, the MAC-h controller 313 generates the HARQ_CLEAR parameter and provides it to the primitive composer 321. Upon receiving the MAC-DATA-IND with the HARQ_PROCESSING parameter from the primitive composer 321, the RLC performs reception buffer management and retransmission request in a method described below, since the MAC-h is performing the HARQ process. Otherwise, upon receiving the MAC-DATA-IND with the HARQ_CLEAR parameter from the primitive composer 321, the RLC performs reception buffer management and retransmission request in the same manner as the general RLC ARQ.

Next, an RLC ARQ process of the RLC operating in the UM will be described with reference to FIG. 5.

Figure 5:
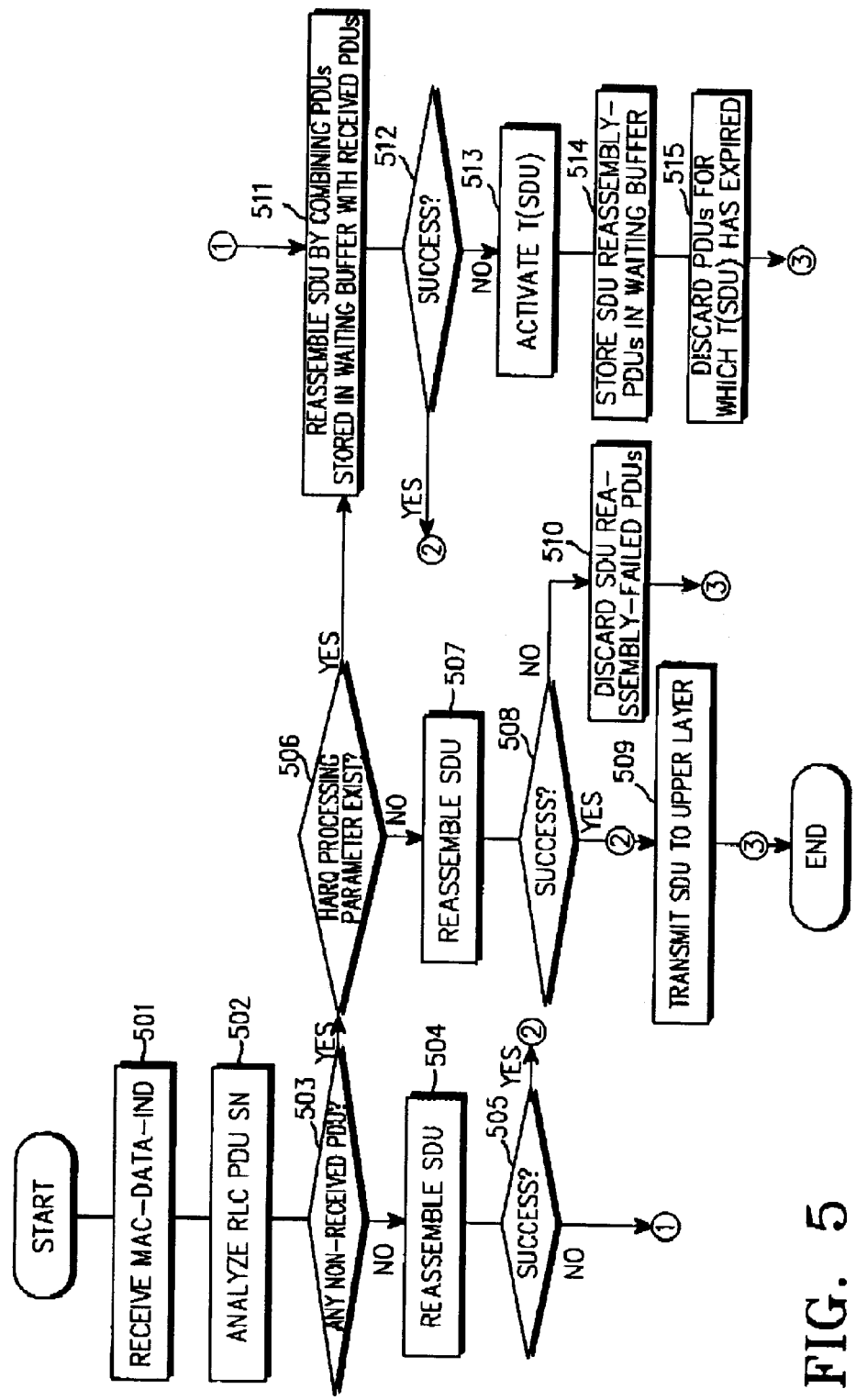
FIG. 5 illustrates an RLC ARQ process according to another embodiment of the present invention.

FIG. 5 illustrates an RLC ARQ process according to another embodiment of the present invention. Referring to FIG. 5, the RLC operating in the UM receives MAC-DATA-IND from a lower layer, i.e., the MAC-h, in step 501, and analyzes SNs of the RLC PDUs included in the received MAC-DATA-IND in step 502. The RLC determines in step 503 whether there are non-received RLC PDUs, based on the SN analysis results on the RLC PDUs. As a result of the determination, if there is no non-received RLC PDU, the RLC reassembles the received RLC PDUs into SDU in step 504. Here, the "non-received RLC PDU" refers to an RLC PDU with non-sequential SN among the RLC PDUs belonging to the MAC-DATA-IND transmitted from the MAC-h at a specific time. The RLC determines in step 505 whether the SDU is successfully reassembled. As a result of the determination, if the SDU is successfully reassembled, the RLC proceeds to step 509 where it transmits the reassembled SDU to the upper layer, and then ends the procedure. However, if the SDU is not successfully reassembled, the RLC proceeds to step 511 where it reassembles SDU by combining the RLC PDUs stored in a waiting buffer with the received RLC PDUs. Thereafter, the RLC determines in step 512 whether the SDU is successfully reassembled. As a result of the determination, if the SDU is successfully reassembled, the RLC proceeds to step 509. However, if the SDU reassembling is failed in step 512, the RLC proceeds to step 513 where it activates T(SDU) for counting an SDU reassembling time. Here, the "T(SDU)", assigned to each SDU, indicates a waiting time for which the RLC PDUs related to a specific SDU are to be stored in the waiting buffer for SDU reassembling. In addition, the "waiting buffer" is a buffer for temporarily storing SDU reassembly-failed RLC PDUs in order to reassemble the SDU when the non-received RLC PDU arrives at the RLC after a success of HARQ. The waiting buffer is discarded, if the RLC PDUs are not successfully reassembled into the SDU before the T(SDU) expires. The T(SDU) value is set to a proper value according to a sate of the Uu interface. After step 513, the RLC stores the SDU reassembly-failed RLC PDUs in the waiting buffer in step 514, and discards the RLC PDUs for which the SDU reassembling time T(SDU) has expired in step 515, and then ends the procedure. In the case of step 515, there are non-received RLC PDUs in the previously received MAC-DATA-IND, and the non-received RLC PDUs are transmitted to the RLC through the HARQ.

Meanwhile, if there exist non-received RLC PDUs in step 503, the RLC determines in step 506 whether there exists the HARQ PROCESSING parameter in the MAC-DATA-IND received from the MAC-h. As a result of the determination, if there exists no HARQ PROCESSING parameter in the MAC-DATA-IND, i.e., if the HARQ CLEAR parameter is included in the MAC-DATA-IND, then the RLC proceeds to step 507 where it reassembles the currently received RLC PDUs into SDU. After step 507, the RLC determines in step 508 whether the SDU is successfully reassembled. If the SDU is successfully reassembled, the RLC proceeds to step 509, where the reassembled SDU is transmitted to the upper layer. However, if the HARQ PROCESSING parameter is included in the MAC-DATA-IND in step 506, the RLC proceeds to step 511.

Next, an RLC ARQ process of the RLC operating in the AM will be described with reference to FIG. 6.

Figure 6:
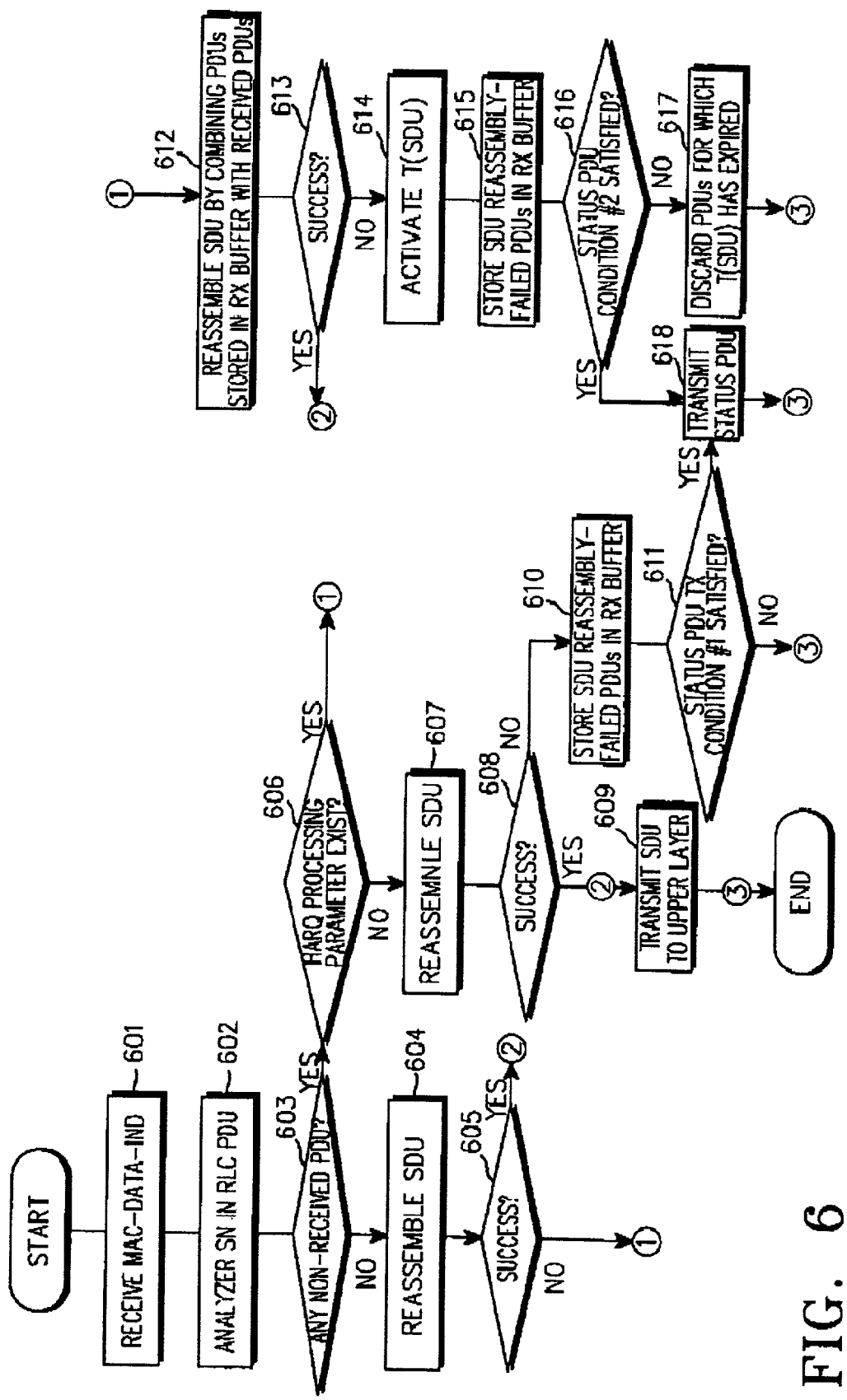
FIG. 6 illustrates an RLC ARQ process according to another embodiment of the present invention.

FIG. 6 illustrates an RLC ARQ process according to another embodiment of the present invention. Referring to FIG. 6, the RLC operating in the AM receives MAC-DATA-IND from a lower layer, i.e., the MAC-h, in step 601, and analyzes SNs of the RLC PDUs included in the received MAC-DATA-IND in step 602. The RLC determines in step 603 whether there are non-received RLC PDUs. As a result of the determination, if there is no non-received RLC PDU, the RLC reassembles the received RLC PDUs into SDU in step 604. The RLC determines in step 605 whether the SDU is successfully reassembled. As a result of the determination, if the SDU is successfully reassembled, the RLC proceeds to step 609 where it transmits the reassembled SDU to the upper layer, and then ends the procedure. However, if the SDU is not successfully reassembled, the RLC proceeds to step 612 where it reassembles SDU by combining the RLC PDUs stored in a reception buffer with the RLC PDUs received through the MAC-DATA-IND, and then proceeds to step 613. In the case of step 612, there are non-received RLC PDUs in the previously received MAC-DATA-IND, and the non-received RLC PDUs are transmitted to the RLC through the HARQ.

Meanwhile, if there exist non-received RLC PDUs in step 603, the RLC determines in step 606 whether the HARQ PROCESSING parameter is included in the received MAC-DATA-IND. As a result of the determination, if the HARQ PROCESSING parameter is not included in the MAC-DATA-IND, i.e., if the HARQ CLEAR parameter is included in the MAC-DATA-IND, then the RLC proceeds to step 607 where it reassembles the currently received RLC PDUs into SDU. After step 607, the RLC determines in step 608 whether the SDU is successfully reassembled. If the SDU is successfully reassembled, the RLC proceeds step 609. However, if the SDU is not successfully reassembled, the RLC proceeds to step 610 where it stores the SDU reassembly-failed RLC PDUs in the reception buffer. After step 610, the RLC determines in step 611 whether STATUS PDU Transmission Condition #1 is satisfied. If the STATUS PDU Transmission Condition #1 is satisfied, the RLC proceeds to step 618 where it transmits the STATUS PDU, and then ends the procedure. Here, the STATUS PDU Transmission Condition #1 can be properly set according to the circumstances, and includes (1) a condition where there are the non-received PDUs, and (2) another condition where a preset timer has expired. When these conditions are satisfied, the RLC transmits the STATUS PDU. In the present invention, a STATUS PDU transmission condition is divided into a case where the HARQ CLEAR parameter was transmitted and another case where the HARQ PROCESSING parameter was transmitted: the former is called "STATUS PDU Transmission Condition #1" and the latter is called "STATUS PDU Transmission Condition #2". STATUS PDU Transmission Condition #1 is prescribed in the same way as the existing STATUS PDU transmission condition. Further, STATUS PDU Transmission Condition #1 is defined as a case where the HARQ CLEAR parameter is received in the common STATUS PDU transmission condition. STATUS PDU Transmission Condition #2 will be described later.

Meanwhile, if the HARQ PROCESSING parameter is included in the MAC-DATA-IND in step 606, the RLC proceeds to step 612 where it reassembles SDU by combining the RLC PDUs stored in the reception buffer with the received RLC PDUs, and then proceeds to step 613. The RLC determines in step 613 whether the SDU is successfully reassembled. As a result of the determination, if the SDU is successfully reassembled, the RLC proceeds to step 609 where it transmits the reassembled SDU to the upper layer. However, if the SDU reassembling is failed in step 613, the RLC proceeds to step 614 where it activates T(SDU) of each of the SDU reassembly-failed RLC PDUs, and then proceeds to step 615. Here, the "T(SDU)", assigned to each SDU, indicates a time for which the RLC PDUs are stored in the reception buffer. The reception buffer operates differently from the waiting buffer used when the RLC operates in the UM. That is, the reception buffer is previously defined in the RLC AM, and stores RLC PDUs related to a specific RLC SDU for the time T(SDU). The reception buffer aims at storing the PDUs until it transmits again the corresponding PDUs, after the RLC of the transmission side receives the STATUS PDU with a retransmission request. Therefore, when the RLC operates in the AM, the T(SDU) may have a value larger than the T(SDU) for the case where the RLC operates in the UM. Meanwhile, the RLC stores the SDU reassembly-failed RLC PDUs in the reception buffer in step 615, and then determines in step 616 whether STATUS PDU Transmission Condition #2 is satisfied. If STATUS PDU Transmission Condition #2 is satisfied, the RLC transmits the STATUS PDU in step 618 and then ends the procedure. However, if STATUS PDU Transmission Condition #2 is not satisfied, the RLC discards the RLC PDUs for which the time T(SDU) has expired in step 617, and then ends the procedure.

STATUS PDU Transmission Condition #2 is prescribed as follows. In the invention, it is presumed that STATUS PDU is not transmitted while the HARQ is performed. That is, a definition is made such that STATUS PDU Transmission Condition #2 is satisfied only when the HARQ PROCESS- ING parameter is not provided. However, in one exception, the transmission may be allowed when it is necessary to transmit the STATUS PDU, even though the HARQ PROCESSING parameter was transmitted under unavoidable situations. STATUS PDU Transmission Condition #2 may be differently defined in order to describe this exceptional case. That is, the exceptional case may correspond to a case where the P bit of the RLC PDU is set.

As described above, the present invention prevents duplicated retransmission on errored data in the mobile communication system. That is, the RLC operating in the AM determines retransmission according to whether the MAC-h is currently performing a retransmission process on the errored data, thereby to prevent unnecessary retransmission on the errored data, thus contributing to an increase in communication efficiency. In addition, the RLC operating in the UM prevents normal data from being discarded by determining whether to discard the errored data according to whether the MAC-h is currently performing a retransmission process on the errored data, contributing to an increase in communication efficiency.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for retransmitting data in a mobile communication system including a MAC-h (Medium Access Control-high speed) layer for performing data retransmission between a UE (User Equipment) and a Node B, and an RLC (Radio Link Control) layer for performing data retransmission between the UE and an RNC (Radio Network Controller), comprising the steps of:
    transmitting, from the MAC-h layer to the RLC layer, received RLC PDUs (Protocol Data Units) and a parameter indicating whether a retransmission process on at least one non-received RLC PDU is being performed; and
    receiving by the RLC layer the RLC PDUs and the parameter, and, if there is at least one non-received RLC PDU associated with the received RLC PDUs, awaiting or performing retransmission on the non-received RLC PDU according to whether the parameter indicates that the retransmission process is being performed.

2. The method as claimed in claim 1, wherein the RLC layer awaits retransmission of the non-received RLC PDU when the parameter indicates that the retransmission process on the non-received RLC PDU is being performed by the MAC-h, and the RLC layer performs retransmission of the non-received RLC PDU when the parameter indicates that the retransmission process on the non-received RLC PDU is not being performed by the MAC-h.

3. A method for retransmitting data in a mobile communication system including a MAC-h (Medium Access Control-high speed) layer for performing data retransmission between a UE (User Equipment) and a Node B, and an RLC (Radio Link Control) layer for performing data retransmission between the UE and an RNC (Radio Network Controller), comprising the steps of:
    transmitting received RLC PDUs (Protocol Data Units) and a parameter indicating whether a retransmission process on at least one non-received RLC PDU is being performed, from the MAC-h layer to the RLC layer; and
    receiving by the RLC layer the RLC PDUs and the parameter, and, if there is at least one non-received RLC PDU associated with the received RLC PDUs, determining whether to perform retransmission on the non-received RLC PDU according to whether the parameter indicates that the retransmission process is being performed.

4. The method as claimed in claim 3, wherein the RLC layer determines to await retransmission of the non-received RLC PDU, if the parameter indicates that the retransmission process on the non-received RLC PDU is being performed by the MAC-h layer.

5. The method as claimed in claim 3, wherein the RLC layer determines to perform retransmission on the non-received RLC PDU, if the parameter indicates that the retransmission process on the non-received RLC PDU is not being performed by the MAC-h layer.

6. A method for retransmitting data in a mobile communication system including a MAC-h (Medium Access Control-high speed) layer for performing data retransmission between a UE (User Equipment) and a Node B, and an RLC (Radio Link Control) layer for performing data retransmission between the UE and an RNC (Radio Network Controller), comprising the steps of:
    receiving, by the RLC layer from the MAC-h layer, RLC PDUs (Protocol Data Units) received by the MAC-h layer and a parameter indicating whether a retransmission process on at least one non-received RLC PDU is being performed;
    analyzing the parameter if there is at least one non-received RLC PDU associated with the received RLC PDUs;
    reassembling a service data unit (SDU) by combining the RLC PDUs received from the MAC-h layer with previously stored RLC PDUs, if the parameter indicates that the retransmission process on the non-received RLC PDU is being performed; and
    reassembling the SDU by combining the RLC PDUs received from the MAC-h layer, if the parameter indicates that the retransmission process on the non-received RLC PDU is not being performed.

7. The method as claimed in claim 6, wherein combining the received RLC PDUs with the previously stored RLC PDUs is repeatedly performed for a preset time.

8. The method as claimed in claim 7, wherein the previously stored RLC PDUs are SDU reassembly-failed RLC PDUs that were failed in reassembling the SDU within the preset time.

9. The method as claimed in claim 7, further comprising the step of sending a retransmission request for the non-received RLC PDU to the RLC layer, if reassembling the SDU does not succeed within the preset time.

10. The method as claimed in claim 8, further comprising the step of discarding the SDU assembly-failed RLC PDUs.

11. An apparatus for retransmitting data in a mobile communication system, comprising;
    a MAC-h (Medium Access Control-high speed) layer for transmitting to an RLC (Radio Link Control) layer received RLC PDUs (Protocol Data Units) and a parameter indicating whether a retransmission process on at least one non-received RLC PDU is being performed; and
    an RLC controller for receiving the RLC PDUs and the parameter, analyzing the parameter if there is at least one non-received RLC PDU associated with the received RLC PDUs, and determining whether to perform retransmission on the non-received RLC PDU according to whether the retransmission process is being performed.

12. The apparatus as claimed in claim 11, wherein the RLC layer determines to await retransmission of the non-received RLC PDU, if the parameter indicates that the retransmission process on the non-received RLC PDU is being performed by the MAC-h layer.

13. The apparatus as claimed in claim 11, wherein the RLC layer determines to perform retransmission on the non-received RLC PDU, if the parameter indicates that the retransmission process on the non-received RLC PDU is not being performed by the MAC-h layer.

14. An apparatus for retransmitting data in a mobile communication system, comprising:

a MAC-h (Medium Access Control-high speed) layer for transmitting to an RLC (Radio Link Control) layer received RLC PDUs (Protocol Data Units) and a parameter indicating whether a retransmission process on at least one non-received RLC PDU is being performed; and an RLC controller for receiving the RLC PDUs and the parameter, analyzing the parameter if there is at least one non-received RLC PDU associated with the received RLC PDUs, and determining whether to await or perform retransmission on the non-received RLC PDU according to whether the retransmission process is being performed.

15. The apparatus as claimed in claim 14, wherein the RLC layer awaits retransmission of the non-received RLC PDU when the parameter indicates that the retransmission process on the non-received RLC PDU is being performed by the MAC-h and the RLC layer performs retransmission of the non-received RLC PDU when the parameter indicates that the retransmission process on the non-received RLC PDU is not being performed by the MAC-h.

* * * * *